US011086386B2

(12) United States Patent
Kogure et al.

(10) Patent No.: US 11,086,386 B2
(45) Date of Patent: Aug. 10, 2021

(54) SEMICONDUCTOR DEVICE, ELECTRIC POWER CONTROL SYSTEM, AND ELECTRIC POWER CONTROL METHOD

(71) Applicant: Renesas Electronics Corporation, Tokyo (JP)

(72) Inventors: Shunsuke Kogure, Tokyo (JP); Takehiro Shimizu, Tokyo (JP); Tatsuwo Nishino, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/059,924

(22) Filed: Aug. 9, 2018

(65) Prior Publication Data

US 2019/0113962 A1 Apr. 18, 2019

(30) Foreign Application Priority Data

Oct. 13, 2017 (JP) ............................ JP2017-199375

(51) Int. Cl.
*G06F 1/3234* (2019.01)
*G06F 1/3296* (2019.01)
(Continued)

(52) U.S. Cl.
CPC .......... *G06F 1/3243* (2013.01); *G06F 1/3203* (2013.01); *G06F 1/3296* (2013.01); *H02P 23/00* (2013.01); *H02P 27/00* (2013.01)

(58) Field of Classification Search
CPC ........ G06F 1/266; G06F 1/263; G06F 1/3206; G06F 1/3228; G06F 1/323; G06F 1/3296;
(Continued)

(56) References Cited

U.S. PATENT DOCUMENTS 6,597,220 B2 7/2003 Mizuno et al.
2002/0095494 A1 7/2002 Fujita et al.
(Continued)

FOREIGN PATENT DOCUMENTS

JP 2000-088605 A 3/2000
JP 2002-202963 A 7/2002
(Continued)

OTHER PUBLICATIONS

Japanese Notice of Reasons for Refusal issued in corresponding Japanese Patent Application No. 2017-199375, dated Jan. 26, 2021, with English translation.

*Primary Examiner* — Jaweed A Abbaszadeh
*Assistant Examiner* — Hyun Soo Kim
(74) *Attorney, Agent, or Firm* — McDermott Will & Emery LLP

(57) ABSTRACT

The power consumption of a circuit block outside a micro-computer and inside the same system is reduced. An electric power control system includes a first power supply circuit, a semiconductor device having a first circuit block operated by electric power supplied from the first power supply circuit, a state holding circuit that holds an operation state in the first circuit block according to the electric power, an electric power control circuit that controls the electric power supplied to the first circuit block according to the operation state, and a first terminal that outputs a first state signal corresponding to the operation state, a second power supply circuit that controls the supply of electric power according to the first state signal, and a second circuit block operated by the electric power supplied from the second power supply circuit.

16 Claims, 15 Drawing Sheets

(51) Int. Cl.
*G06F 1/3203* (2019.01)
*H02P 23/00* (2016.01)
*H02P 27/00* (2006.01)

(58) Field of Classification Search
CPC ........ G06F 1/1221; G06F 1/32; G06F 1/3243; G06F 3/1221; G06F 3/0625; G06F 3/0634
See application file for complete search history.

(56) References Cited

U.S. PATENT DOCUMENTS

2005/0213416 A1* 9/2005 Aimoto ................. G06F 1/3203 365/227
2005/0237347 A1 10/2005 Yamaji et al.
2005/0268164 A1* 12/2005 Hara ................... H04W 52/028 714/14
2008/0178030 A1* 7/2008 Koizumi ............... G06F 1/3203 713/324
2010/0133902 A1* 6/2010 Gotou .................... H03K 17/24 307/18
2012/0162686 A1* 6/2012 Miyamoto ............ G06F 3/1221 358/1.13
2016/0109917 A1* 4/2016 Sasagawa ............... G06F 1/266 713/310
2016/0313942 A1* 10/2016 Noro ..................... G06F 3/0625
2019/0094949 A1* 3/2019 Kurian .................. G06F 1/3296

FOREIGN PATENT DOCUMENTS

JP 2004-234691 A 8/2004
JP 2005-284596 A 10/2005

* cited by examiner

1000
FIRST POWER SUPPLY CIRCUIT
10
p0
SEMICONDUCTOR DEVICE
30
FIRST CIRCUIT BLOCK
31
STATE HOLDING CIRCUIT
32
OPERATION STATE
33
ELECTRIC POWER CONTROL CIRCUIT
34
TERMINAL
35
SBY
SECOND POWER SUPPLY CIRCUIT
20
p1
SECOND CIRCUIT BLOCK
40

MCU
100a
INPUT IF CIRCUIT
110
CPU CORE
120
OUTPUT IF CIRCUIT
RAM
140
Flash
150
TIMER CIRCUIT
170
SYSTEM CONTROL CIRCUIT
160a
REGISTER
161
OPERATION STATE
162
101
di1
di2
di3
ti1
ti2
ti3
do1
do2
PWM
to1
to2
to3
SBY1
ts1
p0
tp1
tp2

MCU
100c
INPUT IF CIRCUIT
110
CPU CORE
120
OUTPUT IF CIRCUIT
130
RAM
140
Flash
150
SYSTEM CONTROL CIRCUIT
160
REGISTER
161
OPERATION STATE
162
CALENDAR CIRCUIT
191
INTERRUPTION CONTROL CIRCUIT
192
101
INT1
INT2
ti1
ti2
ti3
di1
di2
di3
to1
to2
to3
do1
do2
PWM
ti4
RS
ts1
SBY1
tp1
tp2
p0

MCU
200
ti1
ti2
ti3
di1
di2
di3
tp1
tp2
p0
INPUT IF CIRCUIT
110
CPU CORE
120
OUTPUT IF CIRCUIT
130
101
RAM
140
Flash
150
SYSTEM CONTROL CIRCUIT
160
REGISTER
161
OPERATION STATE
162
SBY
IC SELECTION CIRCUIT
180
IC1
IC2
IC3
to1
to2
to3
do1
do2
PWM
ts1
ts2
ts3
SBY1
SBY2
SBY3

| | IC1 | IC2 | IC3 |
|---|---|---|---|
| STATE 1 | 0 | 0 | 0 |
| STATE 2 | 0 | 0 | 1 |
| STATE 3 | 0 | 1 | 0 |
| STATE 4 | 0 | 1 | 1 |
| STATE 5 | 1 | 0 | 0 |
| STATE 6 | 1 | 0 | 1 |
| STATE 7 | 1 | 1 | 0 |
| STATE 8 | 1 | 1 | 1 |

MCU
900
INPUT IF CIRCUIT
110
CPU CORE
120
OUTPUT IF CIRCUIT
130
RAM
140
Flash
150
101
SYSTEM CONTROL CIRCUIT
960
REGISTER
961
OPERATION STATE
962
di1
di2
di3
ti1
ti2
ti3
to1
to2
to3
do1
do2
do3
tp1
tp2
p0

SEMICONDUCTOR DEVICE, ELECTRIC POWER CONTROL SYSTEM, AND ELECTRIC POWER CONTROL METHOD

CROSS-REFERENCE TO RELATED APPLICATIONS

The disclosure of Japanese Patent Application No. 2017-199375 filed on Oct. 13, 2017 including the specification, drawings and abstract is incorporated herein by reference in its entirety.

BACKGROUND

The present invention relates to a semiconductor device, an electric power control system, and an electric power control method. For example, the present invention relates to a semiconductor device, an electric power control system, and an electric power control method, which control electric power.

In recent years, there has been an increasing need for a technique for reducing the power consumption of a microcomputer. For example, Japanese Unexamined Patent Application Publication No. 2004-234691 discloses a technique in which a main circuit inside a microcomputer receives the input of an operation mode, such as a standby mode, of the circuit according to load, and controls the power consumption of the main circuit based on the operation mode.

SUMMARY

Here, Japanese Unexamined Patent Application Publication No. 2004-234691 can reduce the power consumption of the microcomputer alone, but has the problem that the power consumption of the circuit block outside the microcomputer and inside the same system cannot be reduced.

Other objects and novel features will be apparent from the description herein and the accompanying drawings.

According to one embodiment, a semiconductor device has a terminal that outputs a state signal corresponding to its own operation state to outside.

According to the one embodiment, the power consumption of the entire system can be reduced.

DETAILED DESCRIPTION

Figure 1:
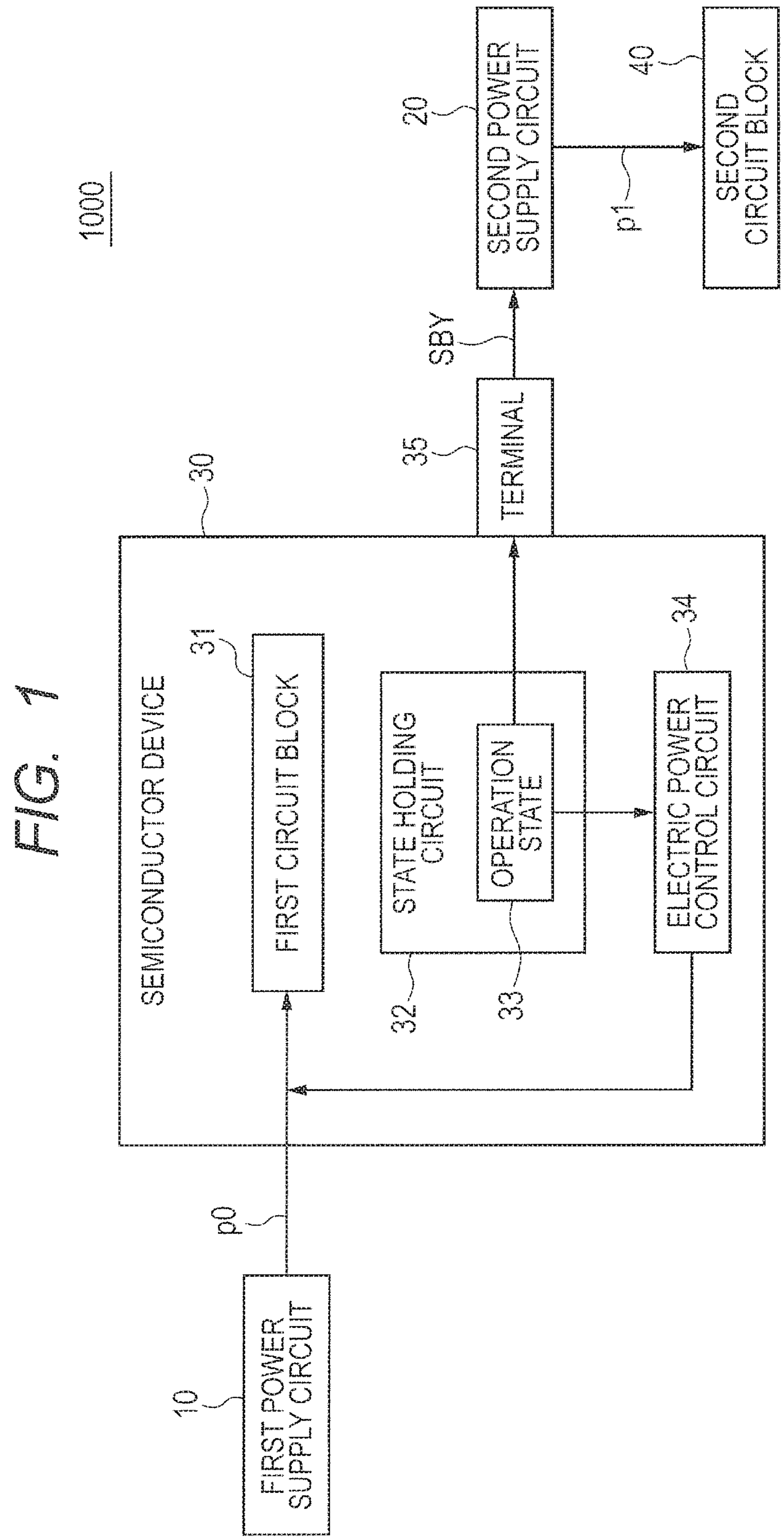
FIG. 1 is a block diagram illustrating the configuration of an electric power control system including a semiconductor device according to a first embodiment.

For clarify the description, the following description and drawings are omitted and simplified, as needed. In addition, the respective elements illustrated in the drawings, as functional blocks that perform various processes, can include a CPU, a memory, and other circuits in terms of hardware, and are achieved by a program loaded into the memory and the like in terms of software. Thus, those skilled in the art can understand that these functional blocks can be achieved in various forms by hardware alone, software alone, or a combination of them, and each of these functional blocks is not limited to any one of hardware, software, and a combination of them. It should be noted that similar elements are indicated by the same reference signs in the respective drawings, and their overlapped description is omitted, as needed.

In addition, the above-described program is stored by using various types of non-temporary computer readable media, and can be supplied to a computer. The non-temporary computer readable media include various types of actual recording media. Examples of the non-temporary computer readable media include a magnetic recording medium (for example, a flexible disk, a magnetic tape, and a hard disk drive), an opto-magnetic recording medium (for example, an opto-magnetic disk), a CD-ROM (Read Only Memory) CD-R, a CD-R/W, and a semiconductor memory (for example, a mask ROM, a PROM (Programmable ROM), an EPROM (Erasable PROM), a flash ROM, and a RAM (Random Access Memory)). In addition, the program may be supplied to the computer by various types of temporary computer readable media. Examples of the temporary computer readable media include an electric signal, an optical signal, and an electromagnetic wave. The temporary computer readable media can supply the program to the computer through a wired communication path, such as an electric wire and an optical fiber, or a wireless communication path.

Here, how the following embodiments have been contemplated will be described.

Figure 15:
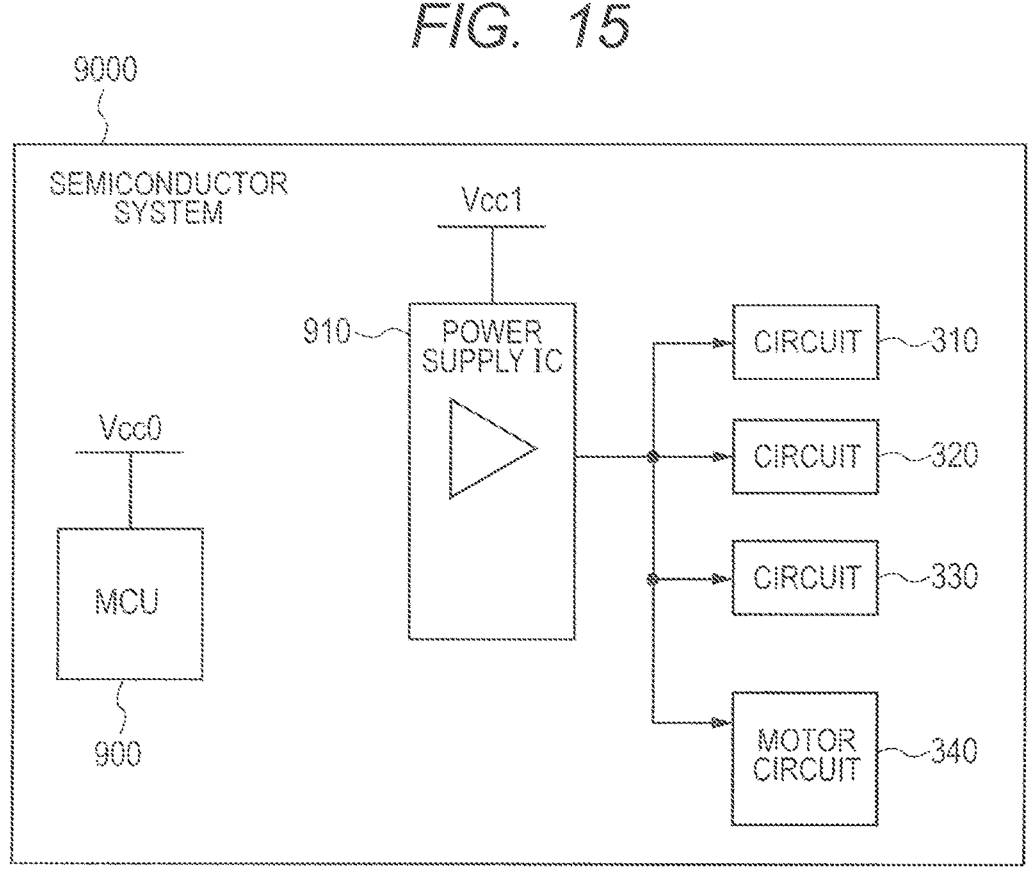
FIG. 15 is a block diagram illustrating the configuration of a semiconductor system according to a related art.

FIG. 15 is a block diagram illustrating the configuration of a semiconductor system 9000 according to a related art. The semiconductor system 9000 includes an MCU (Micro Control Unit) 900 that is an example of a microcomputer, a power supply IC (Integrated Circuit) 910, circuits 310 to 330, and a motor circuit 340. That is, the semiconductor system 9000 has a plurality of semiconductor devices mounted over one chip. Here, electric power is supplied from power supply voltage Vcc0 to the MCU 900, and electric power is supplied from power supply voltage Vcc1 through the power supply IC 910 to the circuits 310 to 330 and the motor circuit 340.

Figure 16:
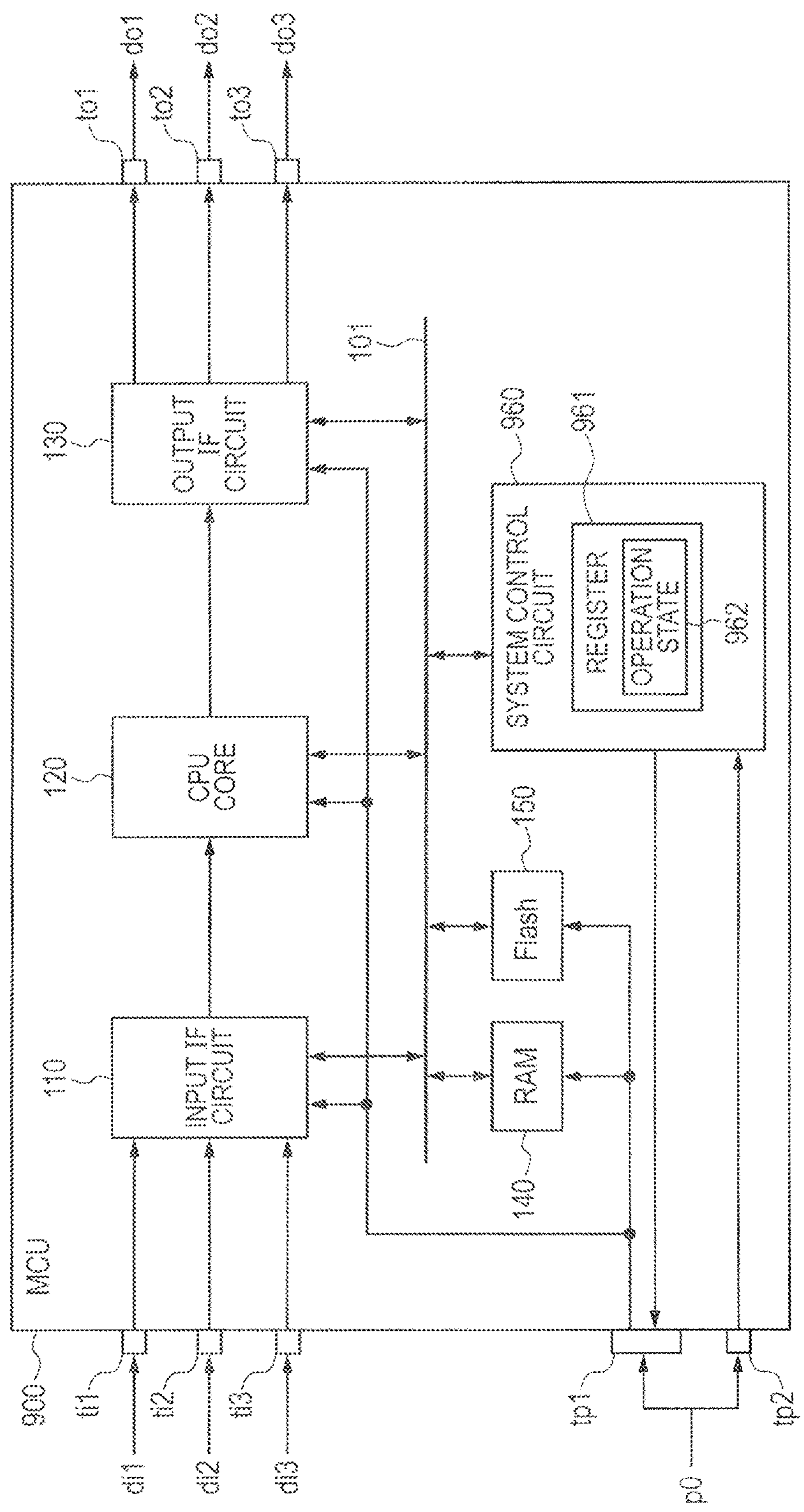
FIG. 16 is a block diagram illustrating the configuration of an MCU according to the related art.

FIG. 16 is a block diagram illustrating the configuration of the MCU 900 according to the related art. The MCU 900 includes an input IF (InterFace) circuit 110, a CPU (Central Processing Unit) core 120, an output IF circuit 130, a RAM 140, a Flash 150, and a system control circuit 960, which are respectively coupled via a bus 101. In addition, the MCU 900 has, as terminals that perform input and output with respect to outside, input terminals ti1 to ti3, output terminals to1 to to3, and power supply terminals tp1 and tp2.

The input IF circuit 110 receives each of input data di1, dig, and di3 from the outside through each of the input terminals ti1, ti2, and ti3, and outputs it to the CPU core 120. The CPU core 120 performs predetermined processing according to the data inputted from the input IF circuit 110 and the request from other configurations, and outputs the processing result to other configurations and the output IF circuit 130. The output IF circuit 130 outputs, as each of output data do1, do2, and do3, the data inputted from the CPU core 120 through each of the output terminals to1, tot, and to3 to the outside. Here, the outside includes other configurations, such as the circuit 310, inside the semiconductor system 9000, or the outside of the semiconductor system 9000. The RAM 140 and the Flash 150 are an example of a storage device.

The system control circuit 960 performs various controls with respect to the inner configuration of the MCU 900. The system control circuit 960 has a register 961. The register 961 holds an operation state 962 that is information representing that the MCU 900 is in an active state or a standby state.

Here, electric power p0 supplied from the power supply voltage Vcc0 to operate the MCU 900 is branched and inputted to the power supply terminals tp1 and tp2. Then, the electric power inputted through the power supply terminal tp1 is supplied to the input IF circuit 110, the CPU core 120, the output IF circuit 130, the RAM 140, and the Flash 150 (hereinafter, called a "circuit block within"). In addition, the electric power inputted through the power supply terminal tp2 is supplied to the system control circuit 960. And, when the operation state 962 changes into the standby state, the system control circuit 960 invalidates the transistor related to the power supply terminal tp1 to cut off the supply of the electric power to the circuit block within. At this time, the transistor related to the power supply terminal tp2 remains valid, so that the electric power is subsequently continued to be supplied to the system control circuit 960. And, when the operation state 962 changes into the active state according to the returning instruction from the outside or the inside, the system control circuit 960 validates the transistor related to the power supply terminal tp1 to restart the supply of the electric power to the circuit block within. In this way, the MCU 900 in which its own operation state changes into the standby state cuts off the electric power supplied from the power supply voltage Vcc0 therein to prevent the power consumption of the circuit block that is most of the inside of the MCU 900.

The description will be continued by returning to FIG. 15. Here, the semiconductor system 9000 can prevent the power consumption of the MCU 900 alone during the standby of the MCU 900, but cannot prevent the power consumption of other configurations except for the MCU 900. That is, during the standby of the MCU 900, the system control circuit 960 cuts off the electric power supply to the circuit block inside the MCU 900, but does not control the electric power supply to the circuits 310 to 330, the motor circuit 340, and the like outside the MCU 900. Consequently, the electric power is continued to be supplied from the power supply voltage Vcc1 through the power supply IC 910 to the circuits 310 to 330, the motor circuit 340, and the like, thereby consuming the electric power. In particular, when the percentage of the power consumption of the MCU 900 in the semiconductor system 9000 is low, it can be said that the reduction effect of the power consumption of the entire system is low. Therefore, the semiconductor system 9000 has a problem in preventing the power consumption of the entire system. Accordingly, the embodiments for solving the above problems will be described below.

First Embodiment

FIG. 1 is a block diagram illustrating the configuration of an electric power control system 1000 including a semiconductor device according to a first embodiment. The electric power control system 1000 includes a first power supply circuit 10, a semiconductor device 30, a second power supply circuit 20, and a second circuit block 40. For example, the electric power control system 1000 has these configurations mounted over one chip.

The semiconductor device 30 includes a first circuit block 31, a state holding circuit 32, an electric power control unit 34, and a terminal 35. The first circuit block 31 includes a plurality of circuits inside the semiconductor device 30, and is operated by the electric power p0 supplied from the first power supply circuit 10. The state holding circuit 32 is a storage device that holds an operation state 33 of the first circuit block 31 according to the electric power p0. The electric power control unit 34 controls the electric power p0 supplied to the first circuit block 31 according to the operation state 33. For example, when the operation state 33 represents that the electric power p0 is to be supplied to the first circuit block 31 as usual, the electric power control unit 34 maintains the supply of the electric power p0 to the first circuit block 31. On the other hand, when the operation state 33 represents that the supply of the electric power p0 to the first circuit block 31 is to be prevented, the electric power control unit 34 cuts off the supply of the electric power p0 to the first circuit block 31. The terminal 35 outputs a state signal SBY corresponding to the operation state 33 to the outside of the semiconductor device 30. It should be noted that the semiconductor device 30 is a microcomputer and the like, but is not limited to this.

The second power supply circuit 20 controls the supply of electric power p1 to the second circuit block 40 according to the state signal SBY. The second circuit block 40 includes a plurality of circuits outside the semiconductor device 30 and inside the electric power control system 1000, and is operated by the electric power p1 supplied from the second power supply circuit 20.

In this way, the semiconductor device 30 outputs the operation state 33 of the electric power, which is supplied to the first circuit block 31 inside the semiconductor device 30, to the second power supply circuit 20 outside the semiconductor device 30 through the terminal 35. Thus, the second power supply circuit 20 can control the supply of the electric power p1 to the second circuit block 40 according to the state signal SBY. That is, the control of the electric power according to the operation state 33 can be synchronized for both the first circuit block 31 inside the semiconductor device 30 and the second circuit block 40 outside the semiconductor device 30. Thus, when the supply of the electric power p0 to the first circuit block 31 is prevented according to the operation state 33, the supply of the electric power p1 to the second circuit block 40 can also be prevented. That is, not only the power consumption of the semiconductor device 30, but also the power consumption of the entire electric power control system 1000, can be reduced with this.

Example 1

Subsequently, an electric power control system and an electric power control method according to Example 1 that is a specific example of the first embodiment will be described.

Figure 2:
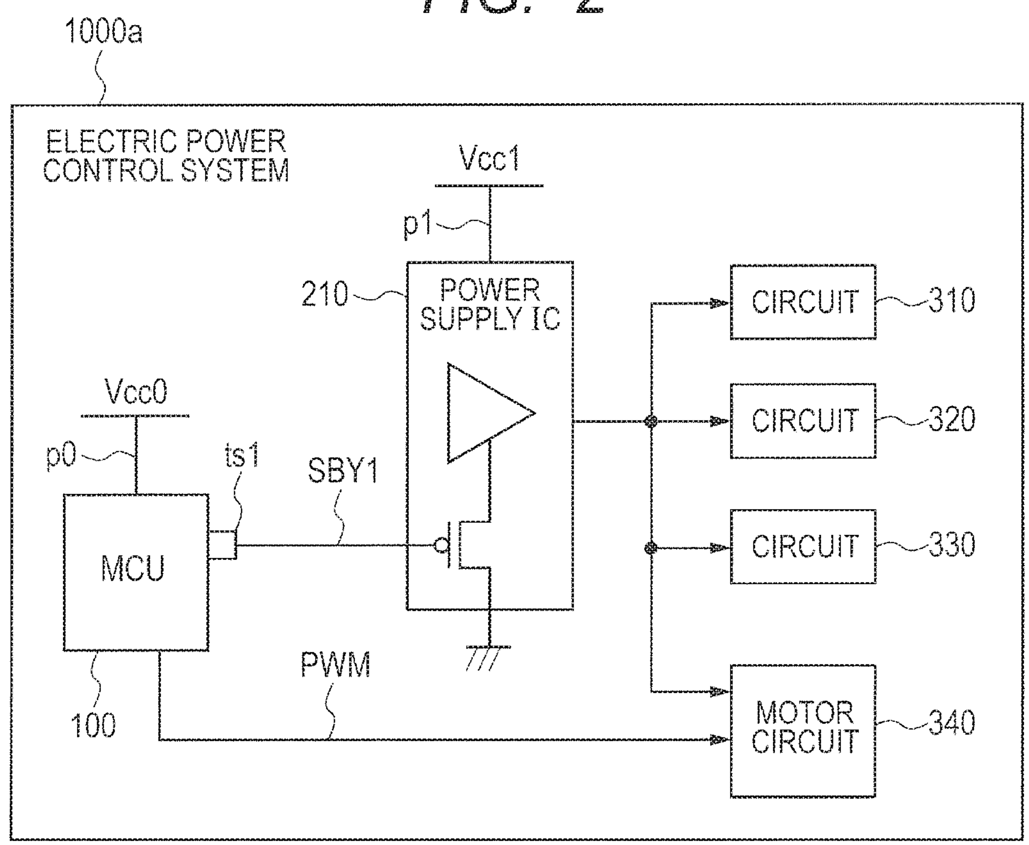
FIG. 2 is a block diagram illustrating the configuration of an electric power control system according to Example 1 of the first embodiment.

FIG. 2 is a block diagram illustrating the configuration of an electric power control system 1000*a* according to Example 1 of the first embodiment. The electric power control system 1000*a* is an example of the above-described electric power control system 1000, and includes an MCU 100, a power supply IC 210, the circuits 310 to 330, and the motor circuit 340. Here, the electric power p0 is supplied from the power supply voltage Vcc0 to the MCU 100, and the electric power p1 is supplied from the power supply voltage Vcc1 through the power supply IC 210 to the circuits 310 to 330 and the motor circuit 340.

The MCU 100 has a terminal ts1, and outputs a standby signal SBY1 through the terminal ts1 to the power supply IC 210. In addition, the MCU 100 outputs a predetermined control signal PWM to the motor circuit 340. Here, the standby signal SBY1 is an example of the above-described state signal, and is a signal corresponding to the operation state of the MCU 100. In addition, the operation state of the MCU 100 includes a normal operation mode (active state) and a standby mode (standby state). However, there may be other operation states, and a plurality of types of operation states may belong to each of the normal operation mode and the standby mode.

Here, the standby signal SBY1 is, for example, a signal having at least one bit. And, when the operation state is the normal operation mode, the standby signal SBY1 representing the normal operation mode is outputted from the terminal ts1 to the power supply IC 210. In this case, for example, the standby signal SBY1 is "0". In addition, when the operation state is the standby mode, the standby signal SBY1 representing the standby mode is outputted from the terminal ts1 to the power supply IC 210. In this case, for example, the standby signal SBY1 is "1". Thus, the circuits on the outside can be controlled according to the state signal.

The power supply IC 210 supplies the electric power p1 from the power supply voltage Vcc1 to the circuits 310 to 330 and the motor circuit 340. However, the power supply IC 210 controls the supply of the electric power p1 to the circuits 310 to 330 and the motor circuit 340 according to the standby signal SBY1. The power supply IC 210 has, for example, a switch circuit that switches the ON/OFF of the supply of the electric power p1 according to the standby signal SBY1. And, when the standby signal SBY1 is "0", the switch circuit is ON, so that the electric power p1 is supplied to the circuits 310 to 330 and the motor circuit 340. In addition, when the standby signal SBY1 is "1", the switch circuit is OFF, so that the supply of the electric power p1 to the circuits 310 to 330 and the motor circuit 340 is cut off.

The circuits 310 to 330 and the motor circuit 340 are an example of the above-described second circuit block 40, and are circuits inside the electric power control system 1000*a* and outside the MCU 100. In addition, the circuits 310 to 330 and the motor circuit 340 are operated by the electric power p1 supplied from the power supply IC 210. In addition, the motor circuit 340 performs processing according to the control signal PWM inputted from the MCU 100.

Figure 3:
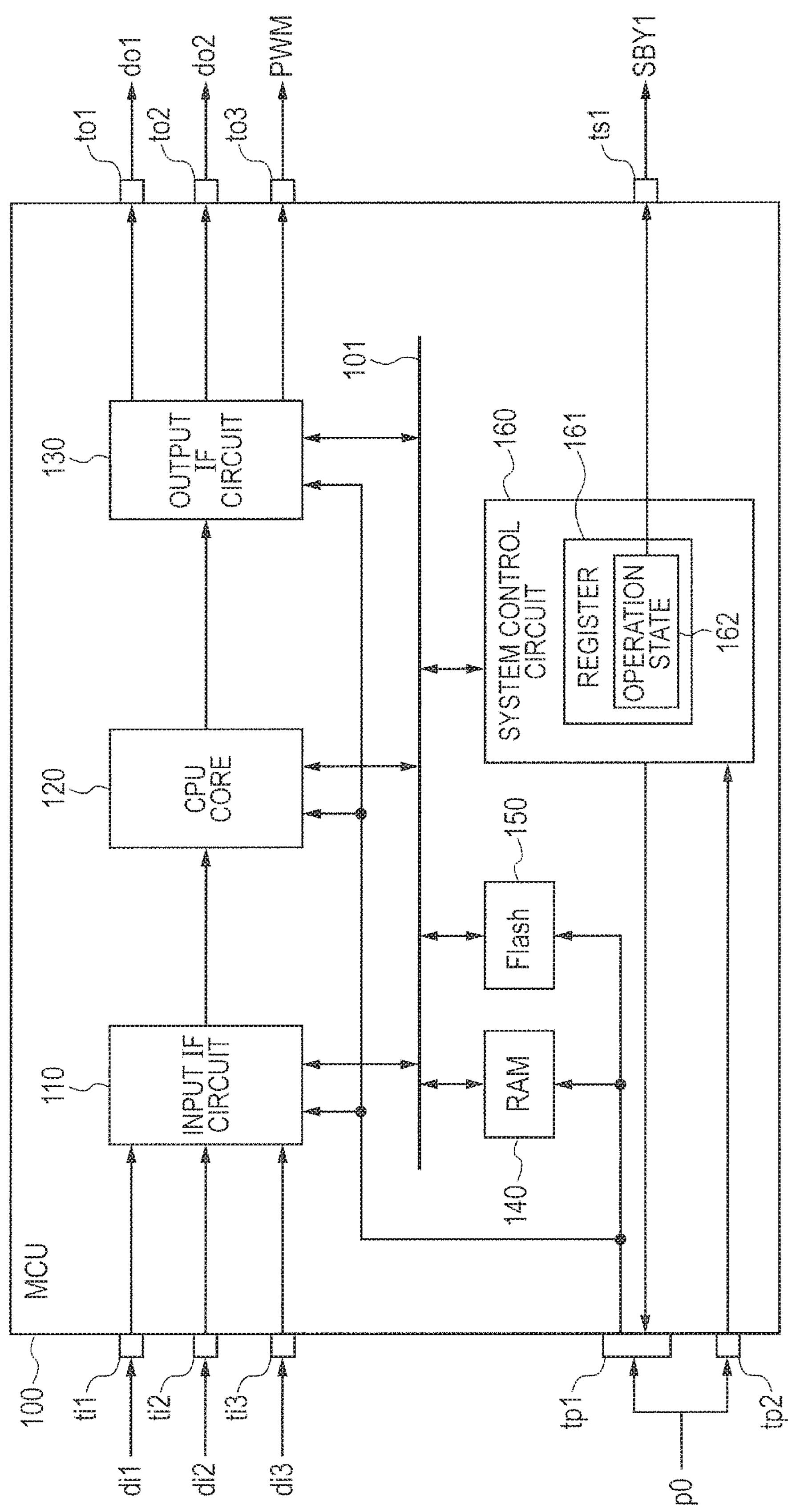
FIG. 3 is a block diagram illustrating the configuration of an MCU according to Example 1 of the first embodiment.

FIG. 3 is a block diagram illustrating the configuration of the MCU 100 according to Example 1 of the first embodiment. The MCU 100 is an example of the above-described semiconductor device 30, and modifies the above-described MCU 900. And, hereinbelow, the configurations equivalent to the MCU 900 are indicated by the same reference signs, and their overlapped description is omitted, as needed.

The MCU 100 includes the input IF circuit 110, the CPU core 120, the output IF circuit 130, the RAM 140, the Flash 150, and a system control circuit 160, which are respectively coupled via the bus 101. In addition to the terminals of the MCU 900, the MCU 100 includes a terminal ts1 as a terminal for inputting and outputting to the outside. It should be noted that in place of the terminal ts1, any one of the existing external output terminals of the MCU 900 may be used. And, the output signal line from the storage area of an operation state 162 held by a register 161 in the system control circuit 160 is coupled to the terminal ts1. It should be noted that the control signal PWM illustrated as the output data from the output terminal to3 in FIG. 3 can be outputted from any output terminal.

The system control circuit 160 is an example of the state holding circuit 32 and the electric power control unit 34, which have been described above. The system control circuit 160 performs various controls with respect to the inner configuration of the MCU 100. The system control circuit 160 has the register 161. The register 161 holds the operation state 162 that is information representing whether the MCU 100 is in the active state or the standby state.

In addition, like the MCU 900, the electric power inputted through the power supply terminal tp1 is supplied to the circuit block within (the input IF circuit 110, the CPU core 120, the output IF circuit 130, the RAM 140, and the Flash 150). In addition, the electric power inputted through the power supply terminal tp2 is supplied to the system control circuit 160. Thus, when the operation state 162 represents the active state, the standby signal SBY1 representing "0" is outputted through the terminal ts1 to the outside.

And, when the operation state 162 changes into the standby state, the system control circuit 160 invalidates the transistor related to the power supply terminal tp1 to cut off the supply of the electric power to the circuit block within. At this time, the transistor related to the power supply terminal tp2 remains valid, so that the electric power is subsequently continued to be supplied to the system control circuit 160. That is, the electric power is continued to be supplied to the register 161 in the system control circuit 160, so that the value of the operation state 162 is held. Thus, when the operation state 162 represents the standby state, the standby signal SBY1 representing "1" is outputted through the terminal ts1 to the outside. It should be noted that the number of power supply terminals in the MCU 100 may be one. In that case, inside the MCU 100, the electric power supply lines from the power supply terminals are branched for the circuit block within and the system control circuit 160, and the system control circuit 160 invalidates the electric power supply line for the circuit block within when the MCU 100 changes into the standby state.

It should be noted that when the MCU 100 changes into the standby state, the input IF circuit 110 and the output IF circuit 130 are also stopped. Consequently, the MCU 100 does not receive the inputs of the signals from the outside, and cannot output the signals from the output terminals to1 to to3 to the outside. Thus, for example, when the above-described MCU 900 is in the standby state, the operation state 962 of the MCU 900 cannot be notified to the outside. On the contrary, in Example 1, even when the MCU 100 is in the standby state, the standby signal SBY1 corresponding to the operation state 162 of the MCU 100 can be notified to the outside. And, at this time, as described above, the power supply IC 210 stops the supply of the electric power p1 to the circuit block outside the MCU 100 (the circuits 310 to 330 and the motor circuit 340). Thus, the supply of the electric power outside the MCU 100 according to the standby signal SBY1 can be controlled.

And, the operation state 162 changes into the active state according to the returning instruction from the outside or the inside, the system control circuit 160 validates the transistor related to the power supply terminal tp1, so that the supply of the electric power to the circuit block within is restarted. Together with this, in this case, the standby signal SBY1 representing “0” is outputted through the terminal ts1 to the outside.

In this way, in Example 1, the operation state 162 originally held in the system control circuit 160 is used as the standby signal SBY1. In addition, in place of the terminal ts1, any one of the existing output terminals to1 to to3 may be used for the MCU 900. Thus, no additional circuits are required as compared with the MCU 900, so that the MCU 100 can be easily achieved.

It should be noted that for example, one aspect of Example 1 can be represented as follows. That is, the circuit block within includes at least a control circuit (for example, the CPU core 120), and an interface circuit that performs input and output with respect to the control circuit and the outside (for example, the input IF circuit 110 and the output IF circuit 130), and when the operation state is the standby mode, the electric power control circuit (for example, the system control circuit 160) cuts off the supply of the electric power to at least the control circuit and the interface circuit, and maintains the supply of the electric power to at least the state holding circuit and the electric power control circuit. Thus, the output of the standby signal can be maintained in the standby state.

Example 2

Subsequently, as Example 2 of the first embodiment, control at returning from the standby state to the active state will be described. Like the electric power control system 1000*a*, when the MCU 100 and a peripheral circuit (the circuit 310 and the like) are provided, the MCU and the peripheral circuit are different in operation speed. Consequently, at the returning of the MCU 100 from the standby state to the active state, even when the supply of the electric power to the circuit block inside the MCU 100 is restarted, the operation of the circuit block on the outside, that is, the peripheral circuit, has not been prepared, so that there is the case where the operation cannot be started immediately.

Thus, in Example 2, when the operation state of the state holding circuit is updated from the standby mode to the normal operation mode, the electric power control circuit restarts the supply of the electric power to the entire semiconductor device. After the circuit on the outside is started according to the state signal and becomes operable, the semiconductor device outputs a control signal to a circuit on the outside.

In other words, the second circuit block performs processing according to the control signal from the semiconductor device. And, when the operation state of the state holding circuit is updated from the standby mode to the normal operation mode, the electric power control circuit restarts the supply of the electric power to the entire semiconductor device according to the operation state, and the second power supply circuit restarts the supply of the electric power to the second circuit block according to the first state signal. And, the semiconductor device outputs the control signal to the second circuit block after the second circuit block is started according to the first state signal and becomes operable. Thus, the MCU can return from the standby state normally. And, the operation at the returning from the standby state will be described by using the following two examples.

Example 2-1

First, as Example 2-1, the semiconductor device further includes a timer circuit, and outputs the control signal after the timer circuit performs counting until the elapse of a predetermined time corresponding to time required for the circuit on the outside to be operable from startup. In other words, the semiconductor device further has a timer circuit, and outputs the control signal after the timer circuit performs counting until the elapse of a predetermined time corresponding to time required for the second circuit block to be operable from startup. Thus, the MCU can return from the standby state normally.

Figure 4:
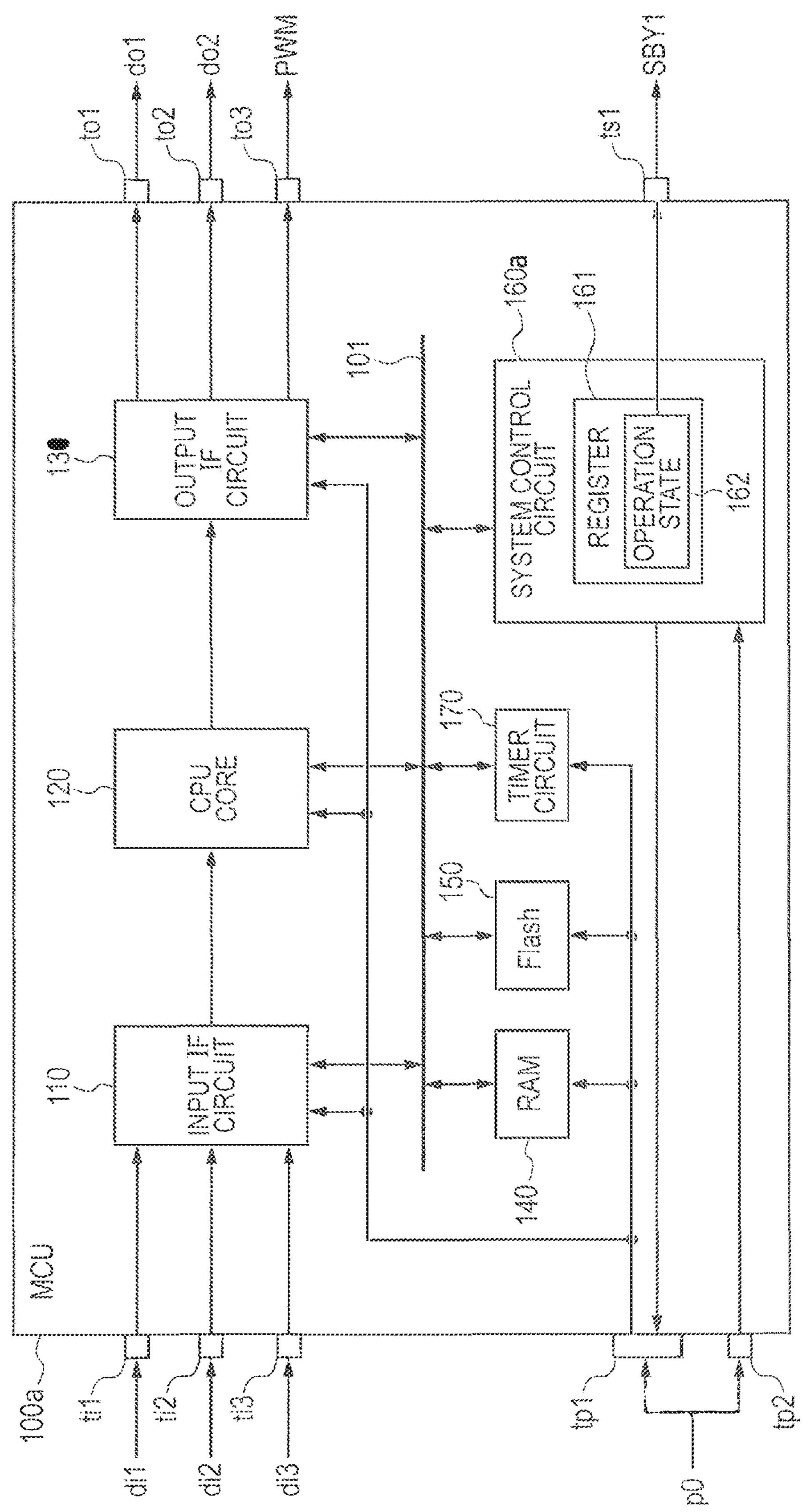
FIG. 4 is a block diagram illustrating the configuration of an MCU according to Example 2-1 of the first embodiment.

FIG. 4 is a block diagram illustrating the configuration of an MCU 100*a* according to Example 2-1 of the first embodiment. The MCU 100*a* is added with a timer circuit 170 as compared with the above-described MCU 100, and the system control circuit 160 is replaced with a system control circuit 160*a*. It should be noted that other configurations of Example 2-1 are equivalent to FIG. 2 described above, and their illustration and description are omitted.

The timer circuit 170 starts counting according to the instruction from the system control circuit 160*a*. In FIG. 4, like other circuit block within, the electric power inputted through the power supply terminal tp1 is supplied to the timer circuit 170. However, like the system control circuit 160*a*, the electric power inputted through the power supply terminal tp2 may be supplied to the timer circuit 170.

When the operation state 162 is updated from the standby state to the active state, the system control circuit 160*a* starts counting by the timer circuit 170, and after the counting time by the timer circuit 170 has exceeded the predetermined time, the control signal PWM is outputted to the motor circuit 340. It should be noted that the predetermined time is time corresponding to time required for the motor circuit 340 that is an example of the second circuit block to be operable from startup, and is previously held in the predetermined storage area in the MCU 100*a*.

Figure 5:
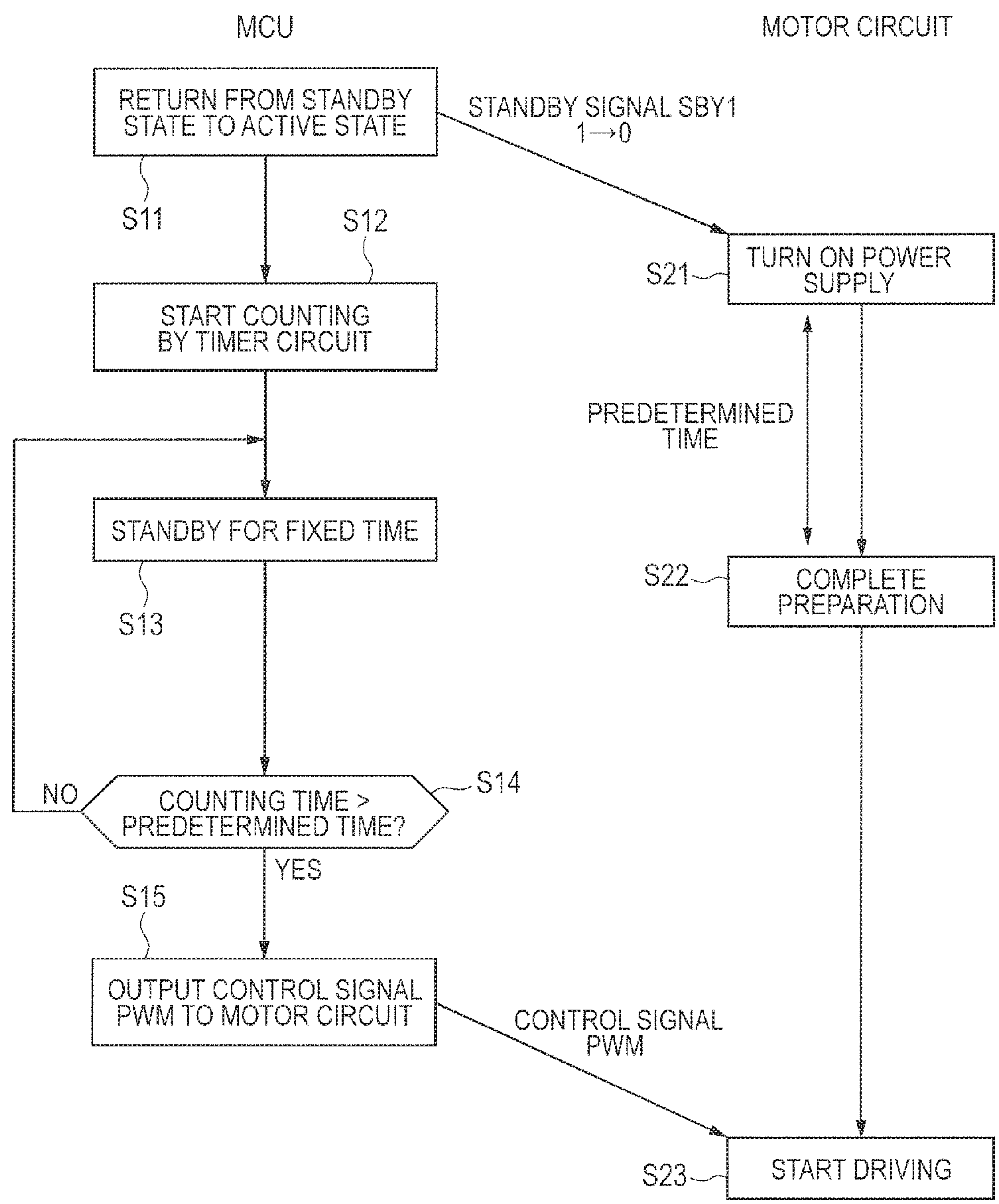
FIG. 5 is a flowchart illustrating the flow of a returning process from a standby state according to Example 2-1 of the first embodiment.

FIG. 5 is a flowchart illustrating the flow of the returning process from the standby state according to Example 2-1 of the first embodiment. First, the MCU 100*a* returns from the standby state to the active state (S11). Specifically, the operation state 162 is updated from the standby state to the active state according to the returning instruction from the outside or the inside, and the value of the standby signal SBY1 outputted from the terminal ts1 changes “1” to “0”. According to this, the power supply IC 210 restarts the supply of the electric power p1 to the circuit block on the outside including the motor circuit 340. Then, the motor circuit 340 turns on the power supply by the supplied electric power p1 (S21).

After step S11, the system control circuit 160*a* starts counting by the timer circuit 170 (S12). And, the system control circuit 160*a* is standby for a fixed time (S13). Thereafter, the system control circuit 160*a* determines whether or not the counting time by the timer circuit 170 has exceeded the predetermined time (S14). When the counting time has not exceeded the predetermined time, the system control circuit 160*a* determines again after the elapse of the fixed time whether or not the counting time has exceeded the predetermined time.

Here, the motor circuit 340 is started after the elapse of the predetermined time after step S21, and the preparation of driving is completed (S22). And, in step S14, when the counting time has exceeded the predetermined time, the MCU 100*a* outputs the control signal PWM to the motor circuit 340 (S15). According to this, the motor circuit 340 starts driving (S23).

It should be noted that the processes in steps S12, S13, and S14 may be performed by other configurations in the MCU 100*a*, for example, the CPU core 120, instead of the system control circuit 160*a*.

Example 2-2

Second, as Example 2-2, the semiconductor device outputs the control signal when receiving, from the circuit on the outside, notification that the circuit on the outside is operable. In other words, when the second circuit block is started according to the supply of the electric power restarted by the second power supply circuit and is operable, the second circuit block notifies an operation returning signal to the semiconductor device, and the semiconductor device receives the operation returning signal from the second circuit block to output the control signal. Thus, the MCU can return from the standby state normally.

Figure 6:
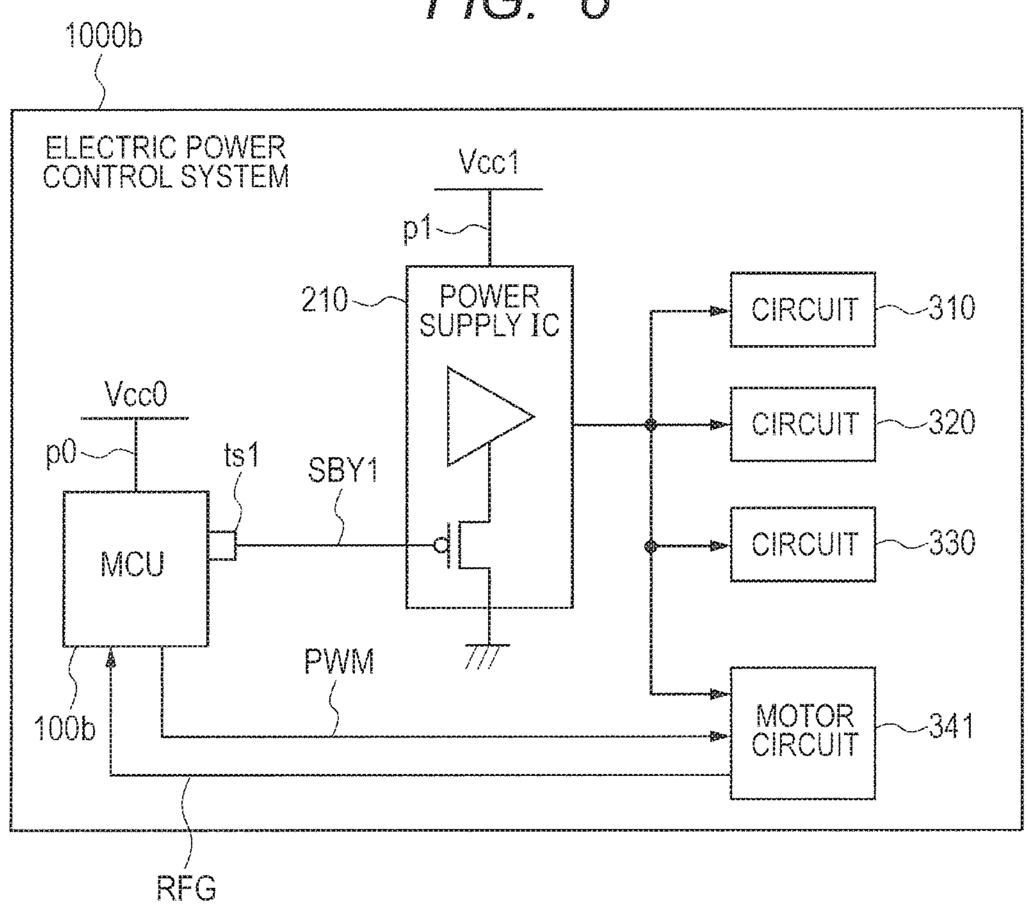
FIG. 6 is a block diagram illustrating the configuration of an electric power control system according to Example 2-2 of the first embodiment.

FIG. 6 is a block diagram illustrating the configuration of an electric power control system 1000*b* according to Example 2-2 of the first embodiment. As compared with the above-described electric power control system 1000*a*, in the electric power control system 1000*b*, the MCU 100 is replaced with the MCU 100*b*, and the motor circuit 340 is replaced with a motor circuit 341. It should be noted that other configurations of Example 2-2 are equivalent to FIG. 2 described above, and their illustration and description are omitted.

The motor circuit 341 is an example of the second circuit block, and when the motor circuit 341 is started according to the supply of the electric power p1 restarted by the power supply IC 210 and is operable, the motor circuit 341 notifies an operation returning flag RFG (operation returning signal) to an MCU 100*b*. The MCU 100*b* receives the operation returning flag RFG from the motor circuit 341 to output the control signal PWM.

Figure 7:
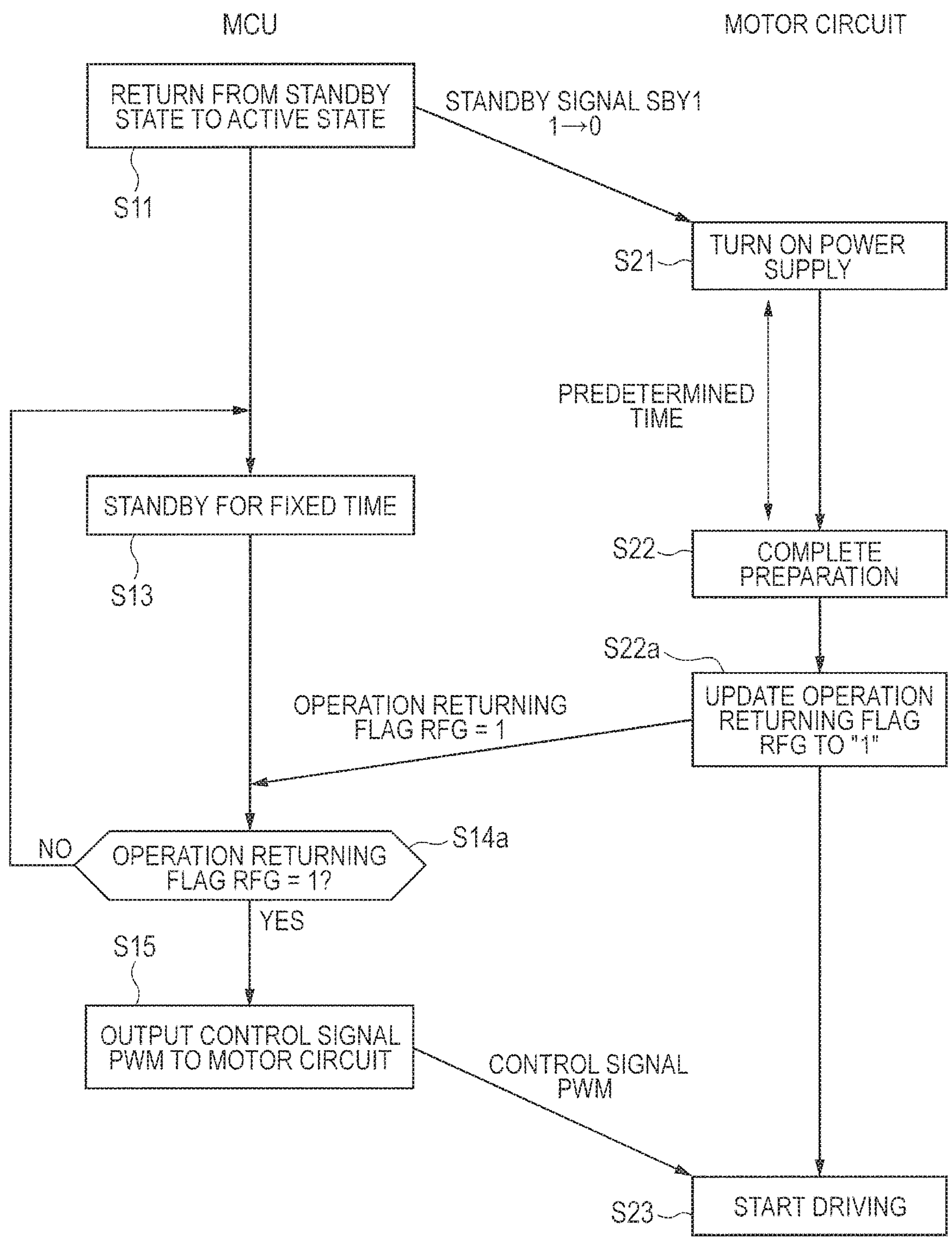
FIG. 7 is a flowchart illustrating the flow of a returning process from a standby state according to Example 2-2 of the first embodiment.

FIG. 7 is a flowchart illustrating the flow of the returning process from the standby state according to Example 2-2 of the first embodiment. First, the MCU 100*b* returns from the standby state to the active state (S11). Specifically, the operation state 162 is updated from the standby state to the active state according to the returning instruction from the outside or the inside, and the value of the standby signal SBY1 outputted from the terminal ts1 changes "1" to "0". According to this, the power supply IC 210 restarts the supply of the electric power p1 to the circuit block on the outside including the motor circuit 341. Then, the motor circuit 341 turns on the power supply by the supplied electric power p1 (S21). It should be noted that at this time, the operation returning flag RFG is "0".

After step S11, the system control circuit 160 is standby for a fixed time (S13). Thereafter, the system control circuit 160 determines whether or not the operation returning flag RFG is "1" (S14*a*). When the operation returning flag RFG is not "1", that is, "0", the system control circuit 160 determines again after the elapse of the fixed time whether or not the counting time has exceeded the predetermined time.

Here, the motor circuit 341 is started after the elapse of the predetermined time after step S21, and the preparation of driving is completed (S22). According to this, the motor circuit 341 updates the operation returning flag RFG to "1" to output it to the MCU 100*b* (S22*a*). And, in step S14*a*, when it is determined that the operation returning flag RFG is "1", the MCU 100*b* outputs the control signal PWM to the motor circuit 341 (S15). According to this, the motor circuit 341 starts driving (S23).

Example 3

Subsequently, as Example 3 of the first embodiment, control at returning from the standby state to the active state with interruption control will be described. In Example 3, the semiconductor device further includes a calendar circuit that generates a signal at a predetermined time, and an interruption control circuit that updates the operation state of the state holding circuit from the standby mode to the normal operation mode according to a returning signal from the outside and the signal generated by the calendar circuit when the operation state is the standby mode, and the electric power control circuit further maintains the supply of the electric power to the calendar circuit and the interruption control circuit when the operation state is the standby mode. Thus, the semiconductor device can safely return from the standby state.

Figure 8:
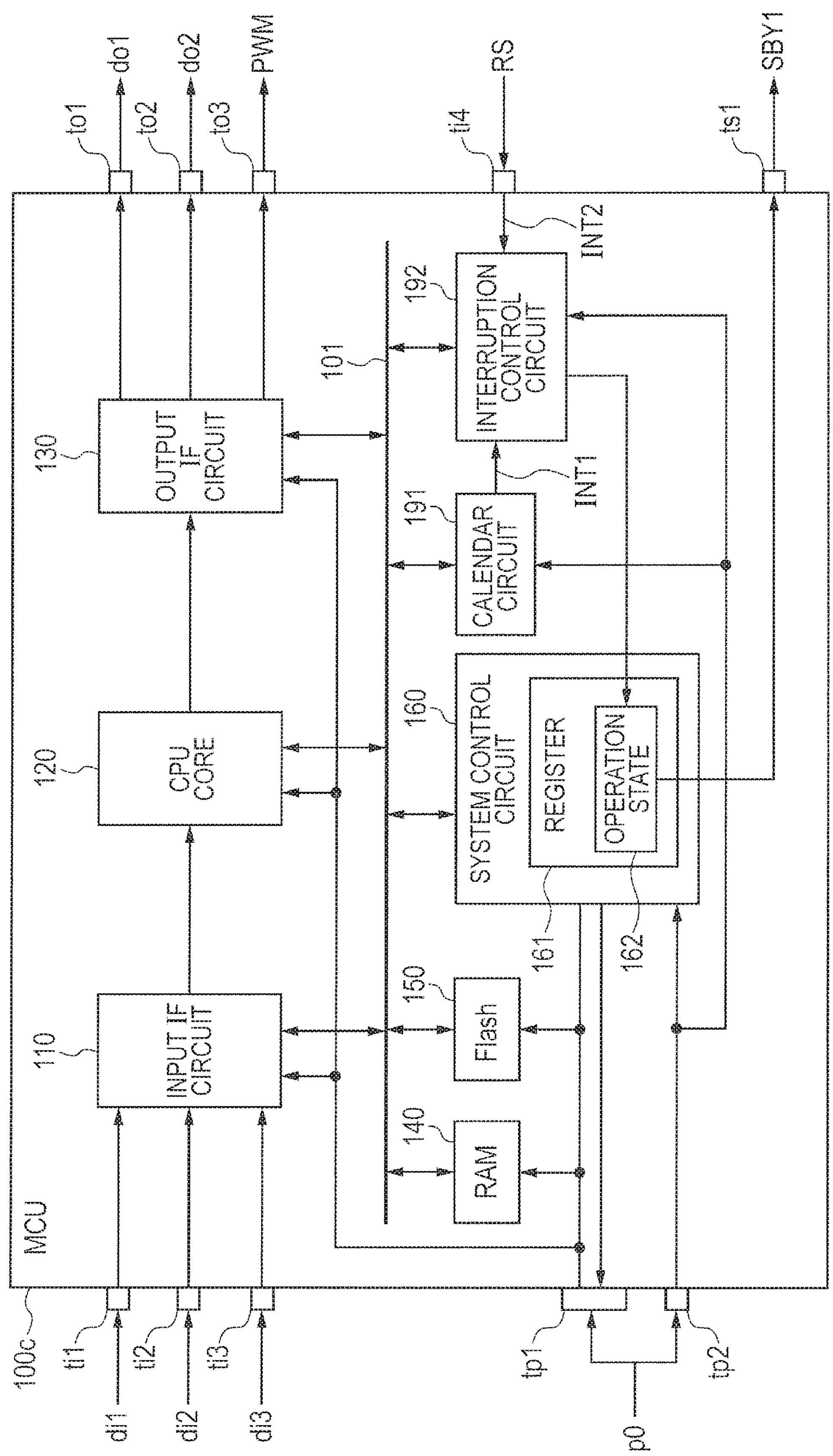
FIG. 8 is a block diagram illustrating the configuration of an MCU according to Example 3 of the first embodiment.

FIG. 8 is a block diagram illustrating the configuration of an MCU 100*c* according to Example 3 of the first embodiment. As compared with the above-described MCU 100, the MCU 100*c* is added with an input terminal ti4, a calendar circuit 191, and an interruption control circuit 192. It should be noted that other configurations of Example 3 are equivalent to FIG. 2 described above, and their illustration and description are omitted. However, in place of the input terminal ti4, any one of the existing input terminals may be used.

The calendar circuit 191 generates an interruption request INT1 at a predetermined time based on a previously defined schedule. The interruption request INT1 outputted from the calendar circuit 191 is inputted to the interruption control circuit 192. In addition, the input terminal ti4 outputs a returning signal RS inputted from the outside, as an interruption request INT2, to the interruption control circuit 192. The interruption control circuit 192 updates the operation state 162 of the register 161 from the standby state to the active state according to the interruption request INT1 or INT2. Here, like the system control circuit 160, the electric power inputted through the power supply terminal tp2 is supplied to the calendar circuit 191 and the interruption control circuit 192. Thus, even when the MCU 100*c* is in the standby state, the system control circuit 160 maintains the supply of the electric power to the calendar circuit 191 and the interruption control circuit 192. Thus, even when the MCU 100*c* is in the standby state, the calendar circuit 191 can output the interruption request INT1, and the interruption control circuit 192 receives the interruption request INT1 or INT2, and can update the operation state 162 according to these.

Second Embodiment

A second embodiment is a modification of the above-described first embodiment.

In the electric power control system 1000*a* according to Example 1 of the above-described first embodiment, the example in which one power supply voltage Vcc1 is mounted besides the power supply voltage Vcc0 that supplies the electric power p0 to the MCU 100 has been described. Here, the case where a plurality of power supply voltages besides the power supply voltage Vcc0 is mounted over one semiconductor system will be studied. First, in that case, an electric power control system 1000*d* to which Example 1 described above is applied will be described.

Figure 9:
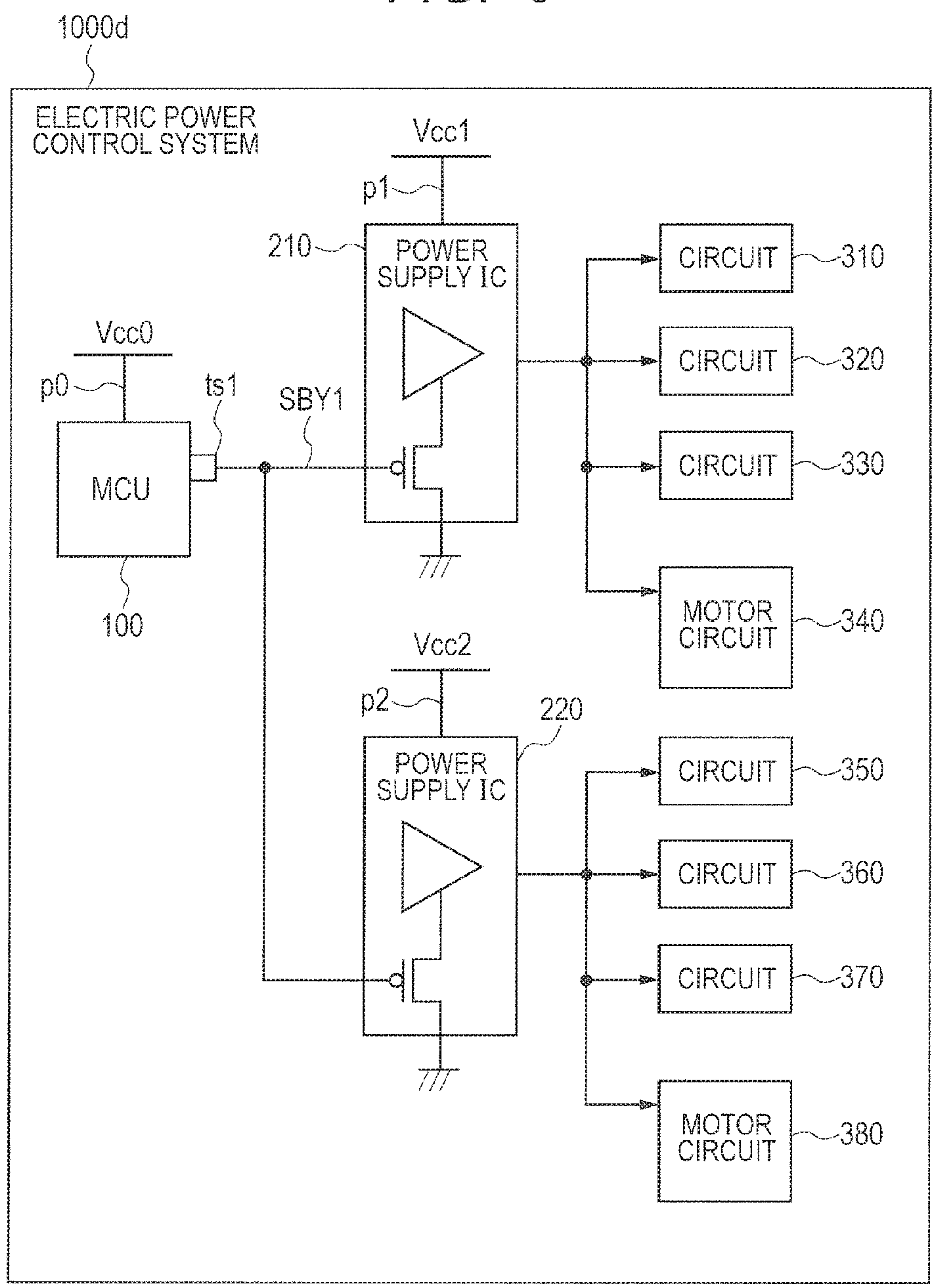
FIG. 9 is a block diagram illustrating the configuration of an electric power control system when a plurality of power supply ICs are mounted.

FIG. 9 is a block diagram illustrating the configuration of the electric power control system 1000*d* when a plurality of power supply ICs is mounted. In addition to the configuration of the electric power control system 1000*a*, the electric power control system 1000*d* includes a power supply IC 220, circuits 350 to 370, and a motor circuit 380. Here, electric power p2 is supplied from power supply voltage Vcc2 through the power supply IC 220 to the circuits 350 to 370 and the motor circuit 380. And, the standby signal SBY1 outputted from the terminal ts1 of the MCU 100 is inputted, not only to the power supply IC 210, but also to the power supply IC 220. Thus, like the power supply IC 210, the power supply IC 220 can control the supply of the electric power to the circuits 350 to 370 and the motor circuit 380 according to the standby signal SBY1.

However, in the case of FIG. 9, to prevent the power consumption in the standby state of the MCU 100, whether or not the supply of the electric powers of all of the power supply IC 210 and power supply IC 220 is cut off can only be controlled according to the standby signal SBY1. Thus, there is the problem that the degree of freedom of the control of the supply of the electric powers is low.

Accordingly, in the second embodiment, a plurality of standby signals corresponding to the respective power supply ICs is outputted from the MCU. That is, the semiconductor device further has a second terminal that outputs a second state signal corresponding to the operation state, and a selection circuit that selects a combination of the signal values of the first state signal and the second state signal according to the operation state held by the state holding circuit and a predetermined selection instruction, and outputs the first state signal and the second state signal corresponding to the combination of the selected signal values to the first terminal and the second terminal. And, the electric power control system further includes a third power supply circuit that controls the supply of electric power according to the second state signal, and a third circuit block operated by the electric power supplied from the third power supply circuit. Thus, the supply of the electric power can be flexibly controlled for each power supply IC.

Figure 10:
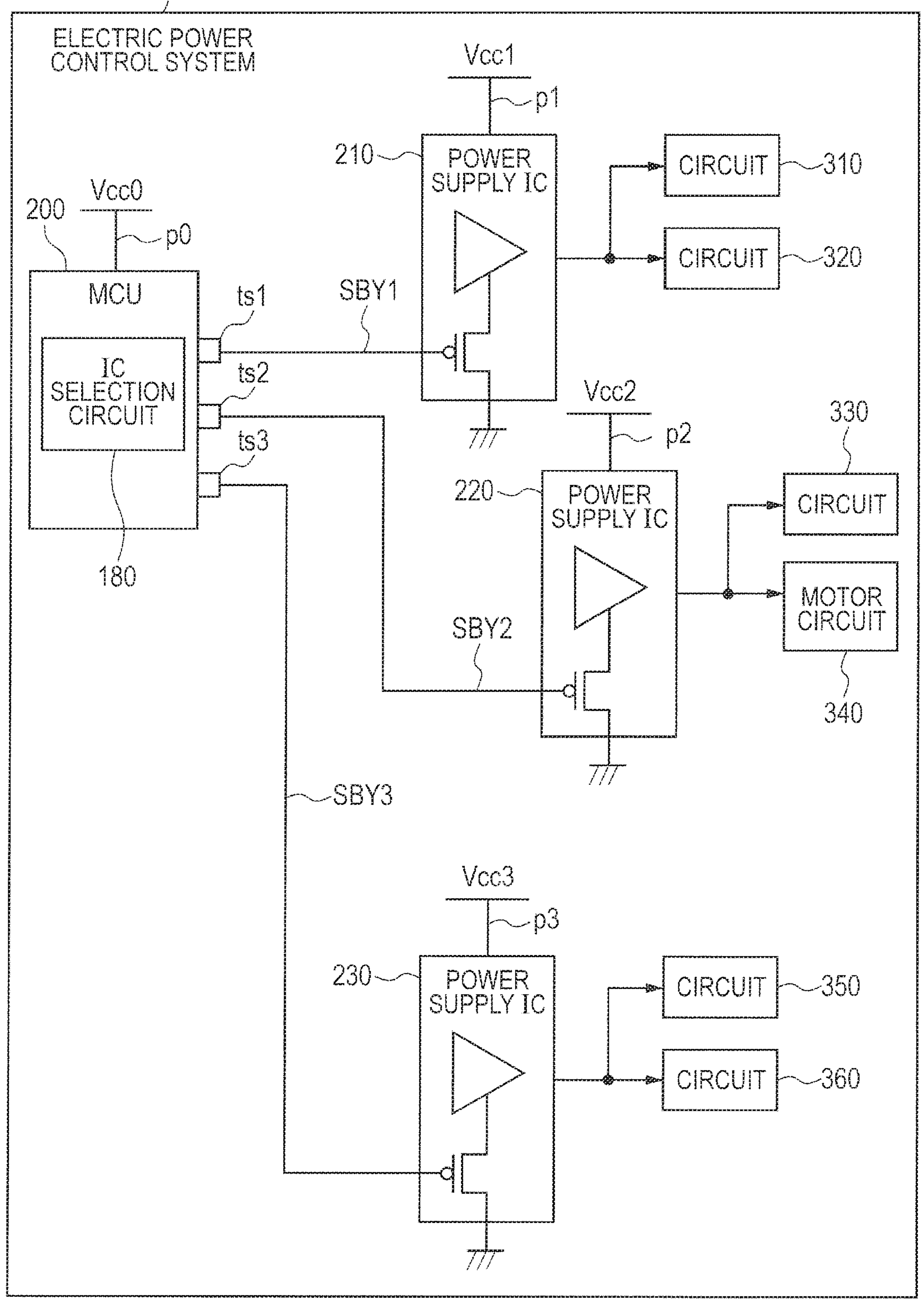
FIG. 10 is a block diagram illustrating the configuration of an electric power control system according to a second embodiment.

FIG. 10 is a block diagram illustrating the configuration of an electric power control system 2000 according to the second embodiment. The electric power control system 2000 is a modification of the above-described electric power control system 1000*a*, and includes an MCU 200, the power supply IC 210 and power supply IC 220, a power supply IC 230, the circuits 310 to 330, 350, and 360, and the motor circuit 340. Here, the electric power p0 is supplied from the power supply voltage Vcc0 to the MCU 200, the electric power p1 is supplied from the power supply voltage Vcc1 through the power supply IC 210 to the circuits 310 and 320, the electric power p2 is supplied from the power supply voltage Vcc2 through the power supply IC 220 to the circuit 330 and the motor circuit 340, and electric power p3 is supplied from power supply voltage Vcc3 through the power supply IC 230 to the circuits 350 and 360. It should be noted that the MCU 200 outputs the predetermined control signal PWM to the motor circuit 340, and its illustration is omitted.

Figure 11:
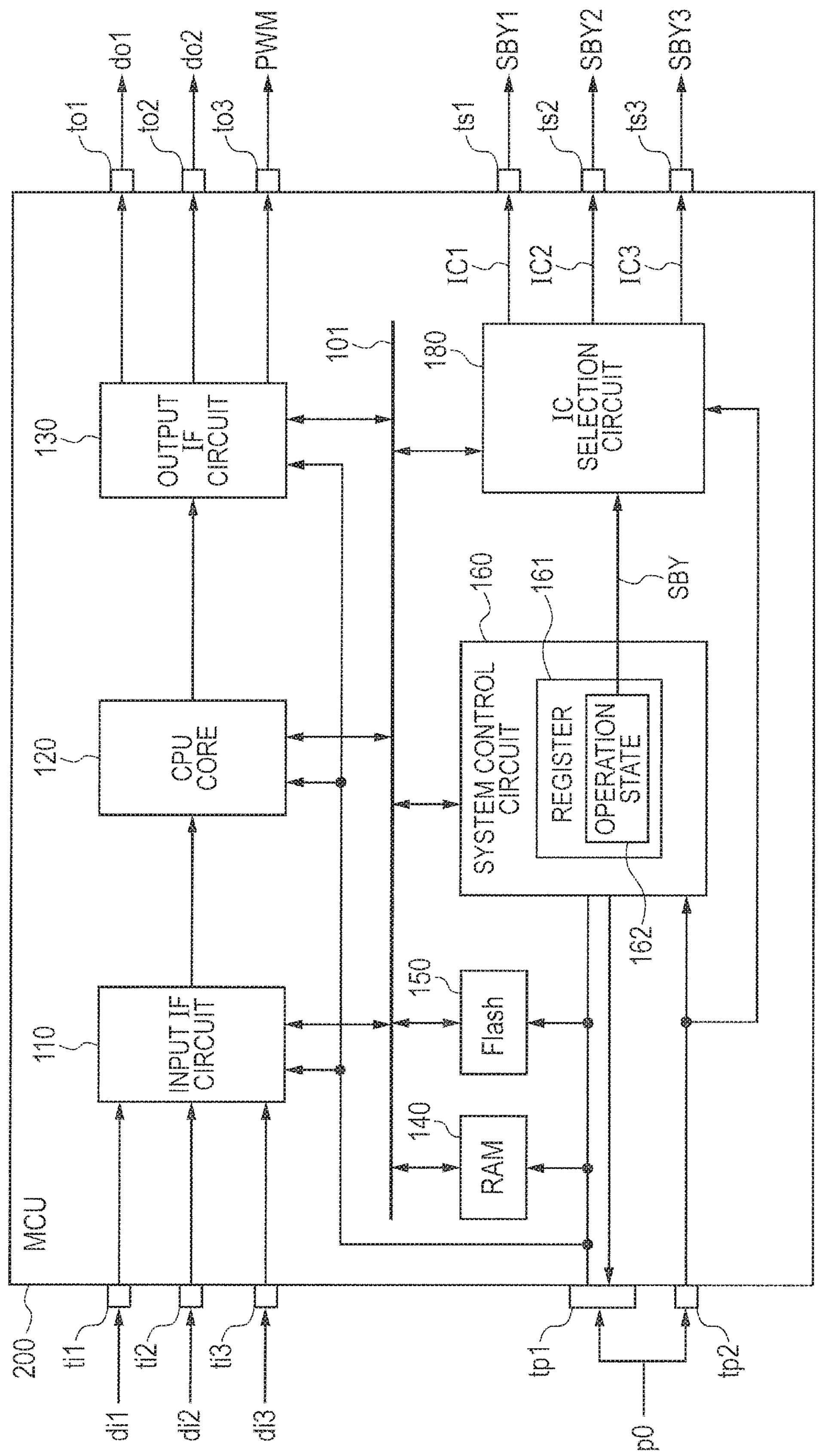
FIG. 11 is a block diagram illustrating the configuration of an MCU according to the second embodiment.

FIG. 11 is a block diagram illustrating the configuration of the MCU 200 according to the second embodiment. Here, the difference from FIG. 3 will be described. As compared with the MCU 100, the MCU 200 further has an IC selection circuit 180, and terminals ts2 and ts3.

Here, like the above-described standby signal SBY1, standby signals SBY2 and SBY3 are an example of the state signal, and are signals corresponding to the operation state of the MCU 200. In addition, the IC selection circuit 180 selects a combination of the signal values of the standby signals SBY1, SBY2 and SBY3 according to the state signal SBY based on the operation state 162 of the MCU 200 and the predetermined selection instruction, and outputs the standby signals SBY1, SBY2 and SBY3 corresponding to the combination of the selected signal values to the terminals ts1, ts2, and ts3. And, the standby signal SBY1 is outputted through the terminal ts1 to the power supply IC 210. Also, the standby signal SBY2 is outputted through the terminal ts2 to the power supply IC 220. Also, the standby signal SBY3 is outputted through the terminal ts3 to the power supply IC 230.

Figures 12, 13:
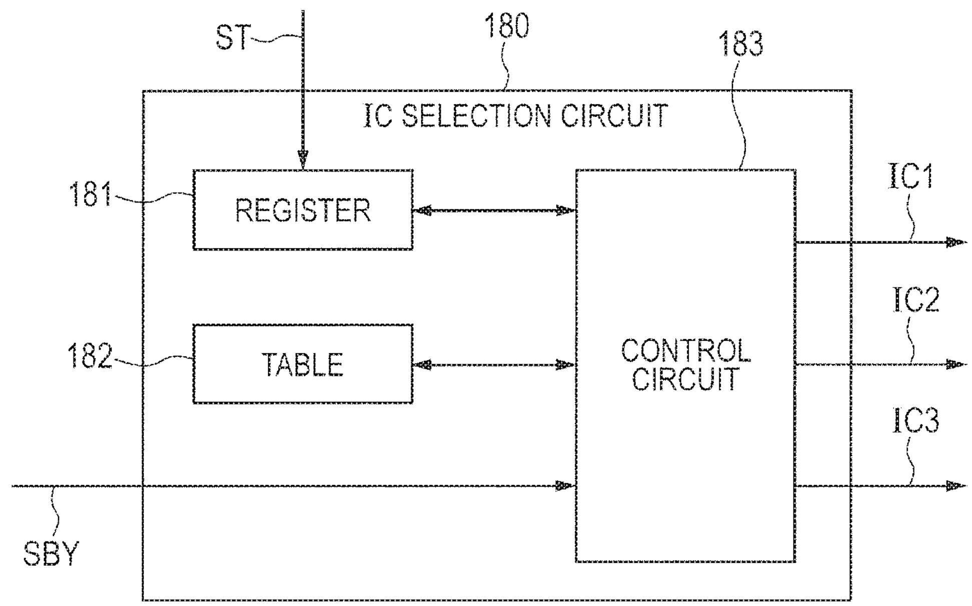
FIG. 12 is a block diagram illustrating the configuration of an IC selection circuit according to the second embodiment.
FIG. 13 is a diagram illustrating an example of a table according to the second embodiment.

FIG. 12 is a block diagram illustrating the configuration of the IC selection circuit 180 according to the second embodiment. The IC selection circuit 180 includes a register 181, a table 182, and a control circuit 183. The register 181 holds IC state information ST set from the CPU core 120 and the like. The IC state information ST is an example of a selection instruction, and is information representing a combination of the signal values of IC state signals IC1, IC2, and IC3. For example, the IC state information ST is information representing "state 1", "state 2", . . . , and "state 8".

The table 182 is information that defines the correspondence relations between the values of a plurality of pieces of IC state information ST and combinations of a plurality of signal values. That is, the table 182 is information that defines each combination of the signal values of the state signals IC1, IC2, and IC3 for selecting whether the electric power is supplied or cut off with respect to each of the power supply ICs. FIG. 13 is a diagram illustrating an example of the table 182 according to the second embodiment. For example, state 1 represents that the supply of the electric powers is maintained, that is, electricity is conducted, with respect to all the power supply ICs 210 to 230, and represents that the values corresponding to the state signals IC1, IC2, and IC3 are defined as "0, 0, 0". In addition, state 2 represents that the supply of the electric powers is maintained with respect to the power supply ICs 210 and 220, so that the supply of the electric power is cut off with respect to the power supply IC 230, and represents that the values corresponding to the state signals IC1, IC2, and IC3 are defined as "0, 0, 1". In addition, state 8 represents that the supply of the electric powers is cut off with respect to all the power supply ICs 210 to 230, and represents that the values corresponding to the state signals IC1, IC2, and IC3 are defined as "1, 1, 1".

The description is continued by returning to FIG. 12. The control circuit 183 obtains the value of the IC state information ST from the register 181, refers to the table 182, and selects a combination of the state signals IC1, IC2, and IC3 corresponding to the value of the IC state information ST. And, the control circuit 183 outputs the logical products of the inputted state signal SBY and the signal values of the state signals IC1, IC2, and IC3 corresponding to the selected combination, to the terminals ts1, ts2, and ts3, respectively. Thus, each of the standby signals SBY1, SBY2, and SBY3 corresponding to the combination of the signal values selected by the IC selection circuit 180 is outputted from each of the terminals ts1, ts2, and ts3. Thus, each of the power supply ICs 210, 220, and 230 controls the supply of the electric power to each circuit according to each of the standby signals SBY1, SBY2, and SBY3. That is, when the state signal SBY represents “0”, each standby signal is always outputted as “0” without depending on the IC state information ST, and when the state signal SBY represents “1”, each standby signal can be outputted as “0” or “1” according to the IC state information ST.

For example, one aspect of the second embodiment can be represented as follows. That is, the semiconductor device further has a table that defines the correspondence relations between a plurality of the selection instructions and combinations of a plurality of the signal values, and the selection circuit refers to the table, and selects the combination of the signal values associated with the selection instruction. Thus, the management of a combination of the standby signals becomes easy, and the selection instruction can also be easy.

It should be noted that the IC selection circuit 180 is not necessarily required to have the table 182. In that case, as the IC state information ST, the combination itself of the signal values of the state signals IC1, IC2, and IC3 is used.

Third Embodiment

A third embodiment is a modification of the above-described first or second embodiment. Typically, a plurality of power supply regions is present inside the MCU. The example in which in the above-described MCU 100 and the like, the electric power is supplied from the single power supply voltage Vcc0 to each power supply region has been illustrated, but there is the case where the electric powers are supplied from the different power supply voltages to the respective power supply regions. For example, there is the case where the electric powers are supplied from the different power supply voltages to the circuit block within in which the supply of the electric power is cut off in the standby state and the system control circuit in which the supply of the electric power is maintained even in the standby state. In such a case, even when the supply of the electric power to the circuit block within is cut off inside the MCU in the standby state, the supply itself of the electric power from the power supply IC that supplies the electric power is not stopped. Consequently, even when the power consumption of the MCU is prevented during the standby, there is the problem that the electric power of the entire semiconductor system is consumed due to the leakage of electric current called leak current.

Accordingly, in the third embodiment, control to allow the power supply IC that is not required to supply the electric power to the MCU during the standby of the MCU to be standby will be described. That is, the electric power control system further includes a fourth power supply circuit that supplies the electric power to the state holding circuit and the electric power control circuit, and the first power supply circuit controls the supply of electric power according to the first state signal. Thus, the leak current during standby can be prevented.

Figure 14:
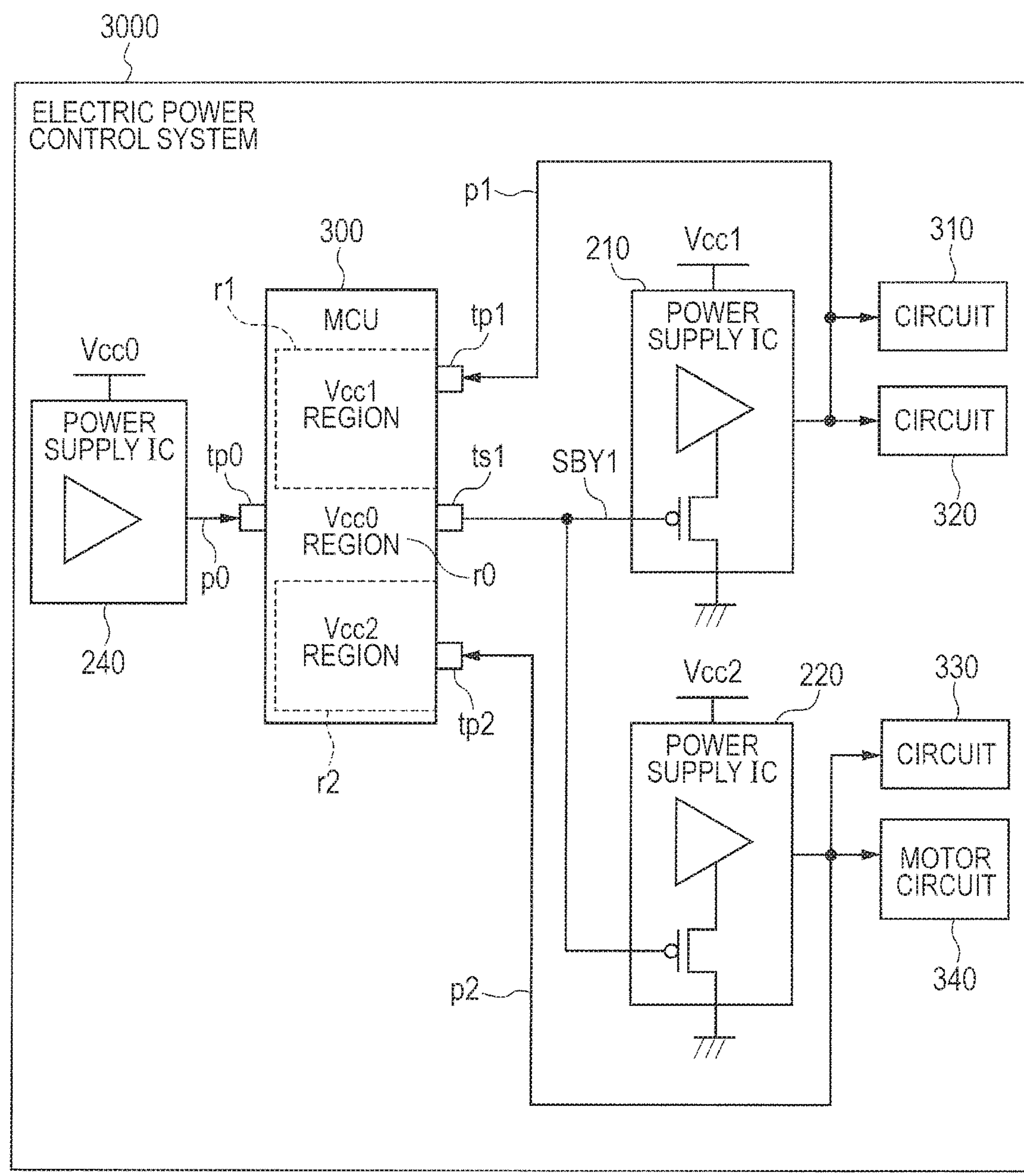
FIG. 14 is a block diagram illustrating the configuration of an electric power control system according to a third embodiment.

FIG. 14 is a block diagram illustrating the configuration of an electric power control system 3000 according to the third embodiment. The electric power control system 3000 is a modification of the above-described electric power control system 1000*a*, and includes an MCU 300, the power supply ICs 210 and 220, a power supply IC 240, the circuits 310 to 330, and the motor circuit 340. It should be noted that the MCU 300 outputs the predetermined control signal PWM to the motor circuit 340, but its illustration is omitted.

The MCU 300 is divided into power supply regions: a Vcc0 region r0, a Vcc1 region r1, and a Vcc2 region r2. The Vcc0 region r0 is a power supply region that maintains the supply of the electric power even in the standby state, and includes, for example, the system control circuit 160 and the like. Thus, the Vcc0 region r0 outputs the standby signal SBY1 through the terminal ts1 to the power supply ICs 210 and 220. In addition, the Vcc1 region r1 and the Vcc2 region r2 are power supply regions that cut off the supply of the electric power in the standby state, and include, for example, the circuit block within.

In addition, the MCU 300 has a power supply terminal tp0, the power supply terminals tp1 and tp2, and the terminal ts1. Here, the power supply IC 240 supplies the electric power p0 from the power supply voltage Vcc0 through the power supply terminal tp0 to the Vcc0 region r0. The power supply IC 210 supplies the electric power p1 from the power supply voltage Vcc1 to the circuits 310 and 320 according to the standby signal SBY1. Further, the power supply IC 210 supplies the electric power p1 through the power supply terminal tp1 to the Vcc1 region r1. In addition, the power supply IC 220 supplies the electric power p2 from the power supply voltage Vcc2 to the circuit 330 and the motor circuit 340 according to the standby signal SBY1. Further, the power supply IC 220 supplies the electric power p2 through the power supply terminal tp2 to the Vcc2 region r2.

Based on the above, the MCU 300 outputs the standby signal SBY1 representing “1” during its own standby to the power supply IC 210 and the power supply IC 220. Then, the power supply IC 210 and the power supply IC 220 cut off the supply of the electric powers p1 and p2 according to the standby signal SBY1. According to this, the supply of the electric power to the Vcc1 region r1 and the Vcc2 region r2 is cut off. On the other hand, the supply of the electric power p0 from the power supply IC 240 is maintained with respect to the Vcc0 region r0. Thus, in the standby state of the MCU 300, the leak current to the Vcc1 region r1 and the Vcc2 region r2 can be prevented from being generated. In addition, the further power consumption reduction during standby can be achieved.

The invention made by the present inventors has been specifically described above based on the embodiments, but the present invention is not limited to the already described embodiments, and needless to say, various modifications can be made in the scope not departing from its purport.

What is claimed is:

1. A semiconductor device comprising:

a first circuit block to which electric power is supplied from a first power supply circuit, the first power supply circuit being disposed outside the semiconductor device;

a state holding circuit that holds an operation state of the first circuit block;

an electric power control circuit that controls the electric power supplied to the first circuit block according to the operation state of the first circuit block; and a terminal that outputs a state signal corresponding to the operation state of the first circuit block to a second power supply circuit, the second power supply circuit being disposed outside the semiconductor device, wherein the second power supply circuit supplies, based on the operation state of the first circuit block, electric power to a second circuit block, the second circuit block being disposed outside the semiconductor device, and wherein the semiconductor device, the first power supply circuit disposed outside the semiconductor device, the second power supply circuit disposed outside the semiconductor device, and the second circuit block disposed outside the semiconductor device are mounted on a single chip.

2. The semiconductor device according to claim 1, wherein the operation state of the first circuit block includes a normal operation mode and a standby mode, wherein when the operation state is the normal operation mode, a first state signal representing the normal operation mode is outputted from the terminal to the second power supply circuit disposed outside the semiconductor device, and wherein when the operation state is the standby mode, a second state signal representing the standby mode is outputted from the terminal to the second power supply circuit disposed outside the semiconductor device.

3. The semiconductor device according to claim 2, wherein the first circuit block includes at least 1) a control circuit and 2) an interface circuit that performs i) input to the control circuit from outside the semiconductor device and ii) output from the control circuit to outside the semiconductor device, and wherein when the operation state is the standby mode, the electric power control circuit cuts off supply of the electric power from the first power supply circuit to at least the control circuit and the interface circuit, and maintains the supply of the electric power first power supply circuit to at least the state holding circuit and the electric power control circuit.

4. The semiconductor device according to claim 3, further including:

a calendar circuit that generates a signal at a predetermined time; and an interruption control circuit that updates the operation state of the state holding circuit from the standby mode to the normal operation mode according to a returning signal from the outside of the semiconductor device or the signal generated by the calendar circuit when the operation state is the standby mode, and wherein the electric power control circuit further maintains the supply of the electric power to the calendar circuit and the interruption control circuit when the operation state is the standby mode.

5. The semiconductor device according to claim 2, wherein the electric power control circuit restarts the supply of the electric power to an entirety of the semiconductor device when the operation state of the state holding circuit is updated from the standby mode to the normal operation mode, and wherein the semiconductor device outputs a control signal to the second circuit disposed outside of the semiconductor device after the second circuit disposed outside the semiconductor device is started according to the state signal and becomes operable.

6. The semiconductor device according to claim 5, further including:

a timer circuit, wherein the semiconductor device outputs the control signal after the timer circuit performs counting until elapse of a predetermined time corresponding to time required for the second circuit disposed outside the semiconductor device to be operable from startup.

7. The semiconductor device according to claim 5, wherein the semiconductor device outputs the control signal when receiving, from the second circuit disposed outside the semiconductor device, a notification that the second circuit disposed outside the semiconductor device is operable.

8. An electric power control system comprising:

a first power supply circuit that supplies electric power to a semiconductor device;

the semiconductor device having 1) a first circuit block operated by the electric power supplied from the first power supply circuit, 2) a state holding circuit that holds an operation state of the first circuit block according to the electric power, 3) an electric power control circuit that controls the electric power supplied to the first circuit block according to the operation state, and 4) a first terminal that outputs a first state signal corresponding to the operation state;

a second circuit block disposed outside the semiconductor device; and a second power supply circuit that 1) receives the first state signal from the semiconductor device and 2) controls supply of electric power to the second circuit block according to the first state signal received from the semiconductor device, wherein the semiconductor device, the first power supply circuit disposed outside the semiconductor device, the second power supply circuit disposed outside the semiconductor device, and the second circuit block disposed outside the semiconductor device are mounted on a single chip.

9. The electric power control system according to claim 8, wherein the semiconductor device further includes:

a second terminal that outputs a second state signal corresponding to the operation state; and a selection circuit that selects a combination of signal values of the first state signal and the second state signal according to the operation state held by the state holding circuit and a predetermined selection instruction, and outputs the first state signal and the second state signal corresponding to a combination of the selected signal values to the first terminal and the second terminal, wherein the electric power control system further includes:

a third power supply circuit that controls the supply of electric power according to the second state signal; and a third circuit block operated by the electric power supplied from the third power supply circuit.

10. The electric power control system according to claim 9, wherein the semiconductor device further includes a table that defines correspondence relations between a plurality of the selection instructions and combinations of a plurality of the signal values, and wherein the selection circuit refers to the table, and selects the combination of the signal values associated with the selection instruction.

11. The electric power control system according to claim 8, further including:

a fourth power supply circuit that supplies electric power to the state holding circuit and the electric power control circuit, wherein the first power supply circuit controls supply of electric power according to the first state signal.

12. The electric power control system according to claim 8, wherein the operation state includes a normal operation mode and a standby mode, wherein when the operation state is the normal operation mode, the first state signal representing the normal operation mode is outputted from the first terminal to the second power supply circuit, and wherein when the operation state is the standby mode, the first state signal representing the standby mode is outputted from the first terminal to the second power supply circuit.

13. The electric power control system according to claim 12, wherein the second circuit block performs processing according to a control signal from the semiconductor device, wherein when the operation state of the state holding circuit is updated from the standby mode to the normal operation mode, the electric power control circuit restarts the supply of the electric power to an entirety of the semiconductor device according to the operation state, and the second power supply circuit restarts the supply of the electric power to the second circuit block according to the first state signal, and wherein the semiconductor device outputs the control signal to the second circuit block after the second circuit block, which is started according to the first state signal, becomes operable.

14. The electric power control system according to claim 13, wherein the semiconductor device further has a timer circuit, and wherein the semiconductor device outputs the control signal after the timer circuit performs counting until elapse of a predetermined time corresponding to time required for the second circuit block to be operable from startup.

15. The electric power control system according to claim 13, wherein when the second circuit block is started according to the supply of the electric power restarted by the second power supply circuit and is operable, the second circuit block notifies an operation returning signal to the semiconductor device, and wherein the semiconductor device receives the operation returning signal from the second circuit block to output the control signal.

16. An electric power control method in a semiconductor system comprising:

a semiconductor device including 1) a first circuit block operated by electric power supplied from a first power supply circuit disposed outside the semiconductor device, 2) a state holding circuit that holds an operation state in the first circuit block according to the electric power, 3) an electric power control circuit that controls the electric power supplied to the first circuit block according to the operation state, and 4) a terminal;

a second power supply circuit; and a second circuit block disposed outside the semiconductor device operated by electric power supplied from the second power supply circuit, wherein the semiconductor device outputs a state signal corresponding to the operation state from the terminal to the second power supply circuit disposed outside the semiconductor device, wherein the second power supply circuit controls supply of the electric power to the second circuit block disposed outside the semiconductor device according to the state signal, and wherein the semiconductor device, the first power supply circuit disposed outside the semiconductor device, the second power supply circuit disposed outside the semiconductor device, and the second circuit block disposed outside the semiconductor device are mounted on a single chip.

* * * * *